United States Patent
Dezonno et al.

(10) Patent No.: US 7,961,867 B2
(45) Date of Patent: Jun. 14, 2011

(54) PEER TO PEER APPLICATION PROCESSOR

(75) Inventors: Anthony J. Dezonno, Bloomingdale, IL (US); Roger A. Sumner, Batavia, IL (US); Sandy Biggam, Bloomingdale, IL (US)

(73) Assignee: Aspect Software, Inc., Lombard, IL (US)

( * ) Notice: Subject to any disclaimer, the term of this patent is extended or adjusted under 35 U.S.C. 154(b) by 1961 days.

(21) Appl. No.: 10/902,621

(22) Filed: Jul. 29, 2004

(65) Prior Publication Data

US 2006/0023868 A1 Feb. 2, 2006

(51) Int. Cl.
*H04M 3/00* (2006.01)

(52) U.S. Cl. .......... 379/265.09; 379/265.01; 379/265.02

(58) Field of Classification Search . 379/265.01–265.02
See application file for complete search history.

(56) References Cited

U.S. PATENT DOCUMENTS

| | | | |
|---|---|---|---|
| 4,680,753 A | 7/1987 | Fulton et al. |
| 4,924,384 A | 5/1990 | Hao et al. |
| 5,555,179 A | 9/1996 | Koyama et al. |
| 5,765,033 A | 6/1998 | Miloslavsky |
| 5,832,195 A | 11/1998 | Braun et al. |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,405,104 B1 | 6/2002 | Dougherty |

(Continued)

FOREIGN PATENT DOCUMENTS

WO        WO 00/28425        5/2000

*Primary Examiner* — Rasha S Al Aubaidi
(74) *Attorney, Agent, or Firm* — Husch Blackwell LLP

(57) ABSTRACT

A method and apparatus are provided for processing information within a computing system. The method includes the steps of detecting a contact with a client of an organization that operates and uses the computing system for its own internal business purposes, providing a processing application within the computing system for distributing the detected contact to one of a plurality of human agents of the organization based upon a context of the contact, where said provided processing application has been previously divided into a sequence of separated software modules based upon a predetermined criteria, locating each software module of the sequence of software modules within a set of computers of the computer system where the set of computers are interconnected via a network and sequentially activating the sequence of software modules of the processing application by performing a search over the network to locate and activate each software module to process and distribute the contact to the human agent.

35 Claims, 3 Drawing Sheets

U.S. PATENT DOCUMENTS

| | | | |
|---|---|---|---|
| 6,434,230 B1 * | 8/2002 | Gabriel | 379/265.01 |
| 6,574,753 B1 | 6/2003 | Haynes et al. | |
| 6,614,783 B1 * | 9/2003 | Sonesh et al. | 370/352 |
| 6,732,156 B2 | 5/2004 | Miloslavsky | |
| 6,879,685 B1 * | 4/2005 | Peterson et al. | 379/265.11 |
| 2001/0026615 A1 | 10/2001 | Couturier | |
| 2003/0041108 A1 * | 2/2003 | Henrick et al. | 709/205 |
| 2004/0083479 A1 | 4/2004 | Bondarenko et al. | |

* cited by examiner

PEER TO PEER APPLICATION PROCESSOR

FIELD OF THE INVENTION

The field of the invention relates to communication systems and more particularly to automatic contact distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are highly reliant upon the proper operation of a computer system for their functionality. The failure of any one element of the computer system that processes the calls may result in the total shutdown of the entire system. Because of the importance of call processing, a need exists for a method of ensuring the integrity and continuity of the operation of automatic call distributors.

SUMMARY

A method and apparatus are provided for processing information within a computing system. The method includes the steps of detecting a contact with a client of an organization that operates and uses the computing system for its own internal business purposes, providing a processing application within the computing system for distributing the detected contact to one of a plurality of human agents of the organization based upon a context of the contact, where said provided processing application has been previously divided into a sequence of separated software modules based upon a predetermined criteria, locating each software module of the sequence of software modules within a set of computers of the computer system where the set of computers are interconnected via a network and sequentially activating the sequence of software modules of the processing application by performing a search over the network to locate and activate each software module to process and distribute the contact to the human agent.

BRIEF DESCRIPTION OF THE DRAWINGS

FIG. 1 depicts a simplified version of the processing system of FIG. 1;

DETAILED DESCRIPTION OF AN ILLUSTRATED EMBODIMENT

Figure 1:
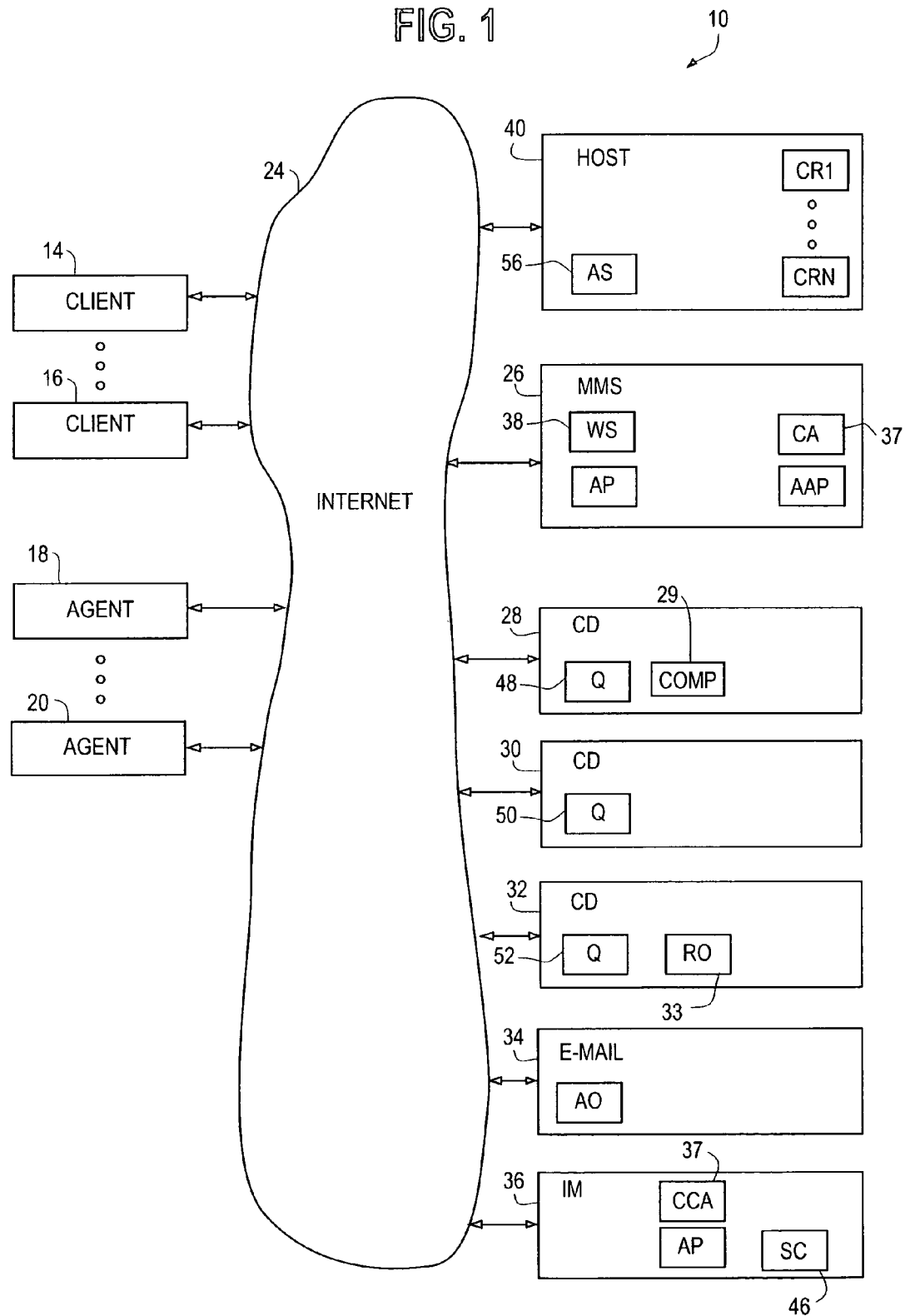
FIG. 1 depicts a computer processing system under an illustrated embodiment of a possible embodiment of the invention.

FIG. 1 is a block diagram of a contact distribution system 10 shown under an illustrated embodiment of a possible embodiment of the invention. The contact distribution system may be used for connecting contacts through the Internet 24 between clients 14, 16 and agents 18, 20. In general, the system 10 may be used by any of a number of different enterprise organizations (e.g., commercial, environmental, political, etc.) to advance the agenda of the enterprise.

The system 10 may include a number of computer resources 26, 28, 30, 32, 34, 36 that function to form the connections between clients 14, 16 and agents 18, 20. As used herein, a computer resource of the organization is a computer application (software) that processes information that is directed related to enterprise operations of the organization. Using the Open Systems Interconnection (OSI) network model, a computer resource is a user application that operates from Layer 7 of the OSI model.

Under illustrated embodiments of one alternative of the invention, each resource is divided up into a sequence of software modules and the software modules are distributed among a number of separate stand-alone computers (i.e., central processing units (CPUs)). As used herein, a stand-alone computer is a functionally complete unit (i.e., it contains its own processor, memory and input/output interface) that is physically separated from other computers in a computer system, is located within its own physical enclosure (cabinet) and is interconnected with other computers of the system via a communications network (e.g., a local area network (LAN), wide area network (WAN), the Internet, etc.) and where the communication network is not a bus.

The applications are activated in a conventional manner. However, data required and produced by each software module of the sequence of software modules is saved in a remote database (that is itself duplicated under separate processes). The system 10 tracks the operation of each software module of the sequence and if a software module should not complete its assigned task within a predetermined time period, a duplicate software module may be activated on another processor.

By dividing each application into a sequence of software modules and distributing the software modules among many different computers, the system 10 is virtually immune to the failure of any computer. If a computer should fail, the system 10 simply moves the functionality of that computer onto another computer.

Turning first to the drawings, an explanation will be provided of an illustrated embodiment of one alternative of the invention in the context of an automatic contact distributor. While one possible alternative of the invention will be initially described in the context of an automatic contact distributor, it should be understood that the alternative embodiments of the invention may have application in any system that relies upon interconnected computers.

As described below, at least some of the computer resources 26, 28, 30, 32, 34, 36 perform predetermined services for other computer resources in furtherance of enterprise objectives of the organization using the system 10. As used herein, a predetermined service performed by one resource for another means the processing of data to achieve some enterprise result that is not directly related to communication connections through the Internet.

Access to the contact center 10 of the organization by clients 14, 16 of the organization may be provided through the Internet 14 under any of a number of different processes. In order to promulgate the agenda of the organization to its clients 14, 16, the organization may publish contact information (e.g., e-mail address, instant message (IM) address or universal resource locator (URL)), by advertising or otherwise, that identifies a communication path to the organization.

Under the illustrated embodiment, the contact distribution system 10 may include one or more contact servers 26, 34, 36 and call distributors 28, 30, 32 that may receive and connect the call to an agent 18, 20 based upon a context of the call (e.g., the target of the contact, the identity of the caller, the availability and skills of any signed-in agents, etc.). The contact servers 26, 34, 36 may function to receive and initially process contacts. A first server 34 may receive contacts in the form of e-mails. A second server 36 may receive contacts under an Instant Messaging (IM) format. A third multi-mode server 26 may receive contacts from one or more web pages downloaded to clients 14, 16 from a website 38 of the multi-mode server 26.

In the case where the organization is a manufacturer with many different products, a different e-mail address may be provided for each different product line. As such, the e-mail server 34 may receive e-mails directed to many different addresses that are all within one or more domain names used by the e-mail server 34. The use of different destination addresses may be used to provide the system 10 with a first level indication of the contact type of the received contact. The IM server 36 and multi-mode server 26 may be used in a similar manner.

Contacts processed by the servers 26, 34, 36 may be initiated in any of a number of different ways. For example, a contact from a client 14, 16 to the multi-mode server 26 may be initiated by activation of a SPEAK WITH AGENT softkey on a webpage downloaded from the multi-mode server 26. Alternatively, contacts from clients 14, 16 may by initiated in response to pop-up ads posted to websites visited by clients 14, 16. Contacts may also be initiated conventionally by a client 14, 16 activating an appropriate application (e.g., Outlook by Microsoft) and entering a Universal Resource Locator (URL) of the organization under an e-mail or IM format in response to a printed ad in a newspaper or magazine.

Contacts from clients 14, 16, received by the servers 26, 34, 36 may be distributed to agents 18, 20 through a number of contact distributors 28, 30, 32. As the contacts arrive, the server 26, 34, 36 receiving the contact may open a file for each contact identified by a unique contact identifier. The file may include at least a source identifier (e.g., an e-mail address, URL, etc.) of the client 14, 16 originating the contact and a destination identifier that identifies the contact destination (e.g., e-mail address, URL, etc.) within the system 10. In the case of contacts received by the multi-mode server 26, information regarding any web pages visited may also be included within the contact file.

A copy of each contact file may be transferred to the host 40. Within the host 40, the information within the contact file may be used to identify further information about the contacting party. For example, the source identifier may be used to classify the contact as originating from existing or new customers. Information on web pages visited or on prior contacts with the client 14, 16 may be used by the host 40 to provide further information regarding the type of contact involved.

Any additional information regarding the contact may be transferred back to the server 26, 34, 36. Within the server 26, 34, 36, the information within the contact file and, possibly, any additional information from the host 40 may be used within a contact classification application 37 to further classify the contact into one or more contact types.

Once a contact type has been determined, the server 26, 34, 36 may transfer the contact to a contact distributor 28, 30, 32. The contact distributor 28, 30, 32 that the server 26, 34, 36 selects to handle the contact may be based upon availability or upon the contact type.

Selection of a contact distributor 28, 30, 32 may be based simply upon status or upon some predetermined criteria. For example, the first contact distributor 28 may be associated with agents 18, 20 who are primarily skilled at handling contacts of a first contact type, the second contact distributor 30 may be associated with agents 18, 20 who are primarily skilled at handling contacts of a second contact type and the third contact distributor 32 may be associated with agents 18, 20 who are primarily skilled at handling contacts of a third contact type.

As such, contacts of the first contact type will normally be transferred to the first contact distributor 28, contacts of the second contact type will be transferred to the second contact distributor 30 and contacts of the third contact type will be transferred to the third contact distributor 32. However, if one or more of the contact distributors 28, 30, 32 is inoperative or otherwise unavailable or is overloaded, then contacts may be handled by any other contact distributor 28, 30, 32.

If the primary contact distributor 28, 30, 32 is available, then the server 26, 34, 36 may transfer the contact along with the file to the appropriate contact distributor 28, 30, 32. Within the contact distributor 28, 30, 32, a contact routing application 33 may compare the contents of the contact file with a list of agent skills and may assign the contact to a qualified agent 18, 20. If an agent is not available, then the agent selection processor may place the contact in a contact queue 48, 50, 52 pending availability of a qualified agent.

Once an agent 18, 20 becomes available, the contact distributor 28, 30, 32 may transfer the contact to the agent 18, 20. The contact distributor 28, 30, 32 may also send notification to an agent server 56 within the host 40 containing the contact identifier and an identifier of the agent 18, 20. As the contact is transferred to the agent 18, 20, the agent server may transfer client records to the selected agent for display on a terminal of the agent at the same instant as the contact arrives at the terminal of the agent 18, 20.

Figure 2:
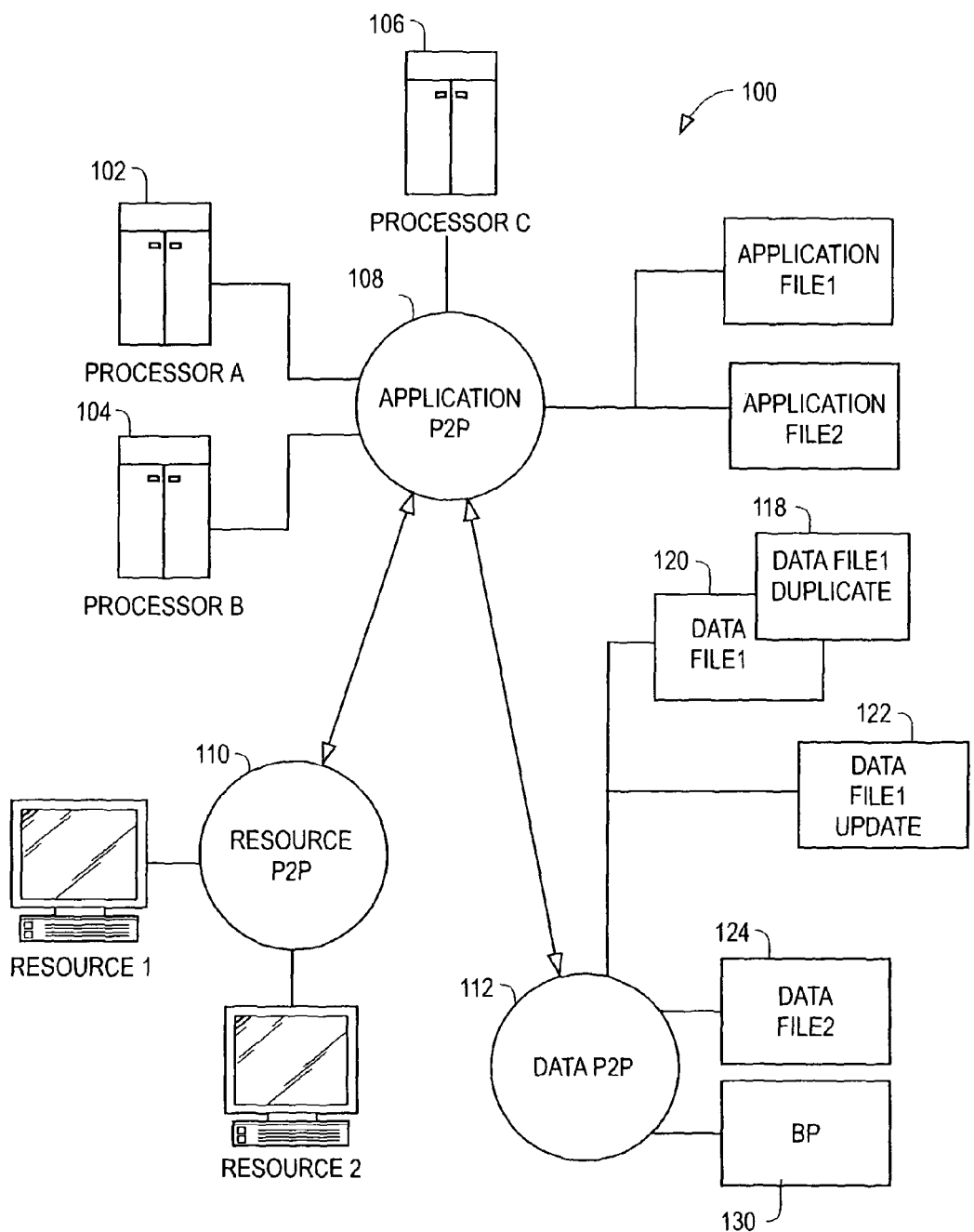

While FIG. 1 depicts the servers 26, 34, 36, the contact distributors 28, 30, 32 and host 40 as being separate entities (each connected to the Internet 24), it should understood that the applications that provide the functionality of these devices may be simultaneously located in any number of computers. FIG. 2 is a generalized hardware diagram that shows how the interaction among the portions (software modules) of the applications of FIG. 1 may occur.

In general, FIG. 2 depicts an example of a peer-to-peer computing system 100 that may be used in the context of the contact distribution system 10 of FIG. 1. As used herein, peer-to-peer computing is characterized by direct connections using virtual namespaces. Peer-to-peer computing means a set of computing nodes that treat each other as equals (peers) and supply processing power, content or applications to other nodes in a distributed manner, with no presumptions about a hierarchy of control.

The peer-to-peer computing architecture as described herein allows for decentralized application design, moving from centralized server models to a distributed model where each peer, independent of software and hardware platforms, can benefit and profit from being connected to a number of other peers. In such architectures, client computers and server computers have a lateral relationship rather than the traditional vertical relationship, giving the whole peer group tremendous processing power and storage space.

In the past, peer-to-peer solutions have primarily been seen as file sharing solutions where users connect to a peer network to transfer files, such as audio files, between machines. Peer-to-peer solutions may be developed based on the Windows XP Peer-to-Peer Software Development Kit (SDK) available from Microsoft Corporation, Redmond, Wash. The peer-to-peer computing architecture described herein differs from the prior peer-to-peer solutions in the fact that the peer-to-peer architecture relies upon distributed software applications, does not per se rely upon the transfer of files for its functionality, uses only a portion of a transferred file (software application) in any one computer and relies upon the use of a virtual private network so that any machine may be considered connected to every other machine and may share applications and data among them. Peer classes may also be provided for each application type to prevent contamination or accidental access of data by applications not privileged to access the data.

In the system of FIG. 2, processors A, B and C (104, 102, 106) connect to and form part of an application peer-to-peer (P2P) network 108 for sharing application executables between the processors. Because of the sharing of executables, references made herein to a network(s) refers to the communication portion of the network, to the computers connected to those networks and to the software operating within the connected computers.

Processor C 106, although optional and shown as a single computer, may be a system controller that monitors the functionality of processors A and B 102, 104, although the functionality of processor C 106 may be included within processors A and B 102, 104. Processor C 106 monitors the network for a heartbeat from processors A and B 102, 104 or for file searches and accesses to the data P2P 112 as an indication of proper software operation by processors A and B 102, 104. Data files 118, 120, 122, 124 may be replicated in the application P2P network by a backup processor 130 that conducts a search to determine if it is a sole copy within the P2P and, if so, duplicating it to an additional computer so that it is available in the case of an outage of the storage system. Files may be stored on multiple processors in each of the networks but are shown separate in FIG. 2 for purposes of illustration.

Global or public data between processors is written as a data file preferably in an XML format to allow for data migration. Data files are also likewise replicated across physical machines to ensure survivability and access in case of a fault in a machine or the network. If a data file is updated, then a duplicate is saved to the network in a configured pattern to ensure the ability to rollback to a given state if a fault is detected.

An optional resource P2P network 110 may also be provided. As resources, such as agents, sign-in and activate their applications, their presence is seen in the resource P2P network 110. A application (e.g., located in computers 102, 104, 106) of the application P2P network 108 may scan and detect the availability of resources needed by a human agent on the resource P2P network 110 and automatically assign them in support of processing transactions (e.g., contacts). As agents sign-in, they can be automatically added to the transaction processing system of processors A and B. Different agent groups may be assigned to be part of a separate P2P network that is being monitored for resource availability. Separate P2P groups also limits the information that must be accessed from outside the group.

Failure of an application processor in this architecture 100 may be addressed by the monitoring processor C 106 reallocating application processing responsibilities to a surviving processor at the point where the fault is detected. When multiple application processors exist, the first processor found by processor C 106 in the search for the next required application to execute may be chosen as the next executing processor. Alternate choice algorithms may be incorporated to select the application processor chosen such as by memory available, the number of applications running, network transmission time, etc.

Data events (e.g., contact arrivals, contact terminations, etc.), when required, are routed to the data P2P 112 for collection by application processors. Likewise, physical hardware interfaces are transformed at the data P2P layer for access by the application P2P layer. As an example, a call control link such as a Transaction Link can have the data messages on the link transformed into an XML representation of the messages received over the link. This data representation is then available to an application P2P network computer for processing. A reverse transform may be made upon the transmitted data to convert it back to a Transaction Link protocol by an application program. Alternately, data events may go directly to an application processor. In this case, the ability of the application to survive the loss of the application processor may lessen if there is only a single data line connection to the application processor. In some embodiments, the data may be directed to an account or service executing on a receiving application being processed by the application network so that malfunctions of a processor servicing the account may be recovered by another processor running in the application network. For example, an application running a Instant Messaging (data messaging) interface may be directed to an account that may be processed by any number of application processors within the application network.

In other embodiments, the data network 112 may be a database. In still further embodiments, the data may be stored within a processor (e.g., 102, 104) that executes the software modules. In this case, the data may be located during a network search based upon a set of file extensions.

Messaging interfaces (e.g., using protocols such as Session Initiation Protocol (SIP)) may be provided directly between resource entities instead of through the data P2P network 112. In this way, data may be sent directly to a program executing on the resource entity for control or display rather than to the resource entity collecting information from the data P2P. It is preferred that programs be run solely on the application P2P 108 with the resource P2P 110 acting as a thin or display only client to reduce support and maintenance costs.

Application files may be created and compiled directly in such a manner to further enhance survivability and distribution among the peer network. Many traditional software development methodologies, whether object oriented or sequentially programmatic, rely on a self-contained approach wherein application functionality is within a single processing mechanism or controlled from or through a single computational processor. In contrast, the system 100 functions to distribute files in such a manner as to avoid the situation where application files exist within a single processing entity.

Figure 3:
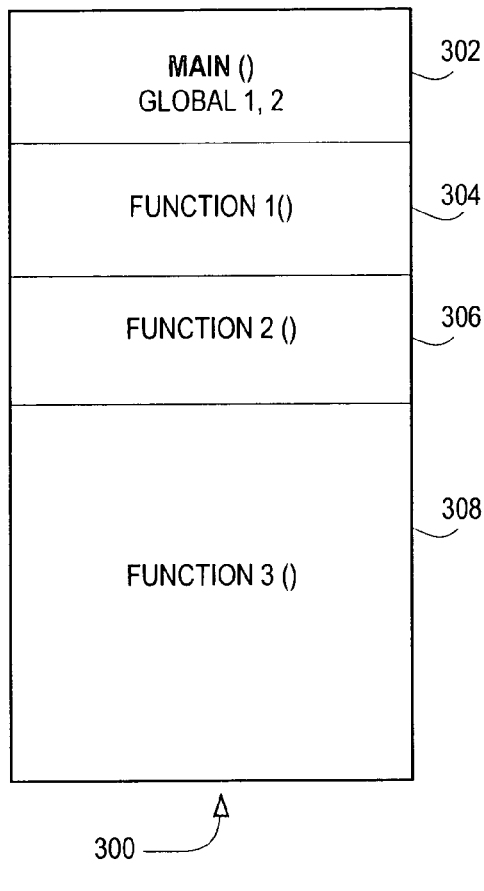
FIG. 3 depicts an application that may be compiled by the system of FIG. 2.

Turning now to the applications, in specific, an explanation will be provided as to how the applications may be divided for operation on a number of different computers. In the proposed approach, each program (application) 300 (FIG. 3) is compiled (e.g., within the compiler 54 of FIG. 1) into a sequence of functional executable sub-applications 302, 304, 306, 308 for distribution out and through the application P2P network. Alternatively, programs 300 may be assembled within a communications and control wrapper so to be considered separated software modules deployable on the application P2P network. Elements such as subroutines, function calls and their equivalents are complied as stand-alone entities (each hereinafter referred to, generically, as software modules), that when requiring global variables or external data access go to the data P2P 112 to retrieve this information and behave in the manner described so far.

The number of size of each software module into which an application may be divided may be based upon any number of a predetermined criteria. A first criteria may require that each software module be the same size. Alternatively, the criteria may require that a processing time of a set of executables assume a predetermined proportion with regard to the I/O requirements and break points may be determined accordingly. An additional alternative may be to divide into a software module any call to execute program code that is not within a main code module. Another alternative may be to divide into a software module any call to execute program code that is repetitive in nature or that is frequently used. Another alternative criteria may be to allocate program code associated with pieces of computer system hardware.

In addition, the software modules may be distributed based upon the operating idiosyncrasy of the computer system in which the application operates. For example computers connected to heavily loaded portions of the network may be assigned software modules with very low I/O requirements. Heavily loaded computers connected to lightly loaded portions of the network may be assigned software modules with relatively low processing requirements and relatively high I/O requirements. Alternatively, the processor utilization requirements of a module may be taken into consideration to determine the allocation of processing. The system may limit the allocation of multiple routines requiring large amounts of processor utilization onto a single processor, or may insure that the processor utilization is not exceeded by the allocated routines.

As the overall application executes, a search on the application P2P 108 is first performed for the application component (software module) in question. In the case of the contact distribution system 10 of FIG. 1, the arrival of a contact (e.g., an e-mail at the e-mail server 34) may trigger a function call to an application to classify the contact.

Figure 4:
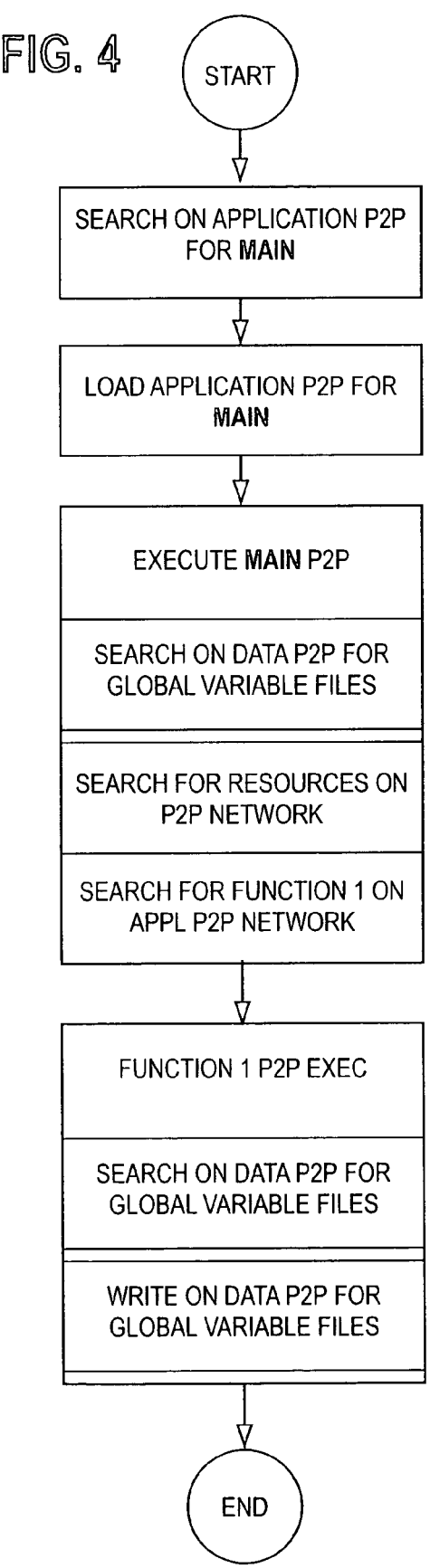
FIG. 4 is a flow chart that depicts the steps that may be performed by the system of FIG. 2.

FIG. 4 depicts the process of execution of an application. While FIG. 4 only depicts the main software module and software module 1, it would be understood that the process would be similar no matter how many software modules were involved.

The initial application element may be stored locally on the processor searching for the application element for speed considerations, but must be available on the network for reliability, as well as upgrade purposes. Globally identified data is collected from the data P2P 112 as required. Likewise, resource connections are also processed through monitoring a specific resource P2P 110. Processor C 106 may function as a P2P network coordinator to keep track of the P2P elements comprising the overall system. It is to be understood, however, that the function of a P2P network coordinator is not required in all possible embodiments.

The processor C 106 may monitor the operation of each software module of the sequence under a number of different processes. Under a first process, the processor C 106 may set a flag on the first function call of the sequence. The flag may be used as a timer to monitor operation of the software module. If the software module does not save an interim result to the data P2P 112 or issue a function call for the next software module in the sequence within a predetermined period of time, then the processor C 106 may independently locate and activate another copy of the previously activated software module. The process of locating another copy of a software module may be accomplished using a simple LDAP routine or through using the functions or services of the P2P development architecture.

In another embodiment, the function calls may simply be issued by the processor C 106. In this case, the processor 106 may be provided with a sequential list of software modules. The processor C may monitor for situations that should cause activation of an application. In the case of the system 10 of FIG. 1, the processor C 106 may monitor the e-mail server 34 for the receipt of e-mails. Detection of the receipt of an e-mail would be regarded as a condition required for activation of an e-mail server application. In this case, the processor C 106 may search an internal list to find the sequence of e-mail software modules of the e-mail server 34.

Upon locating the list, the processor C 106 may issue a function call for a first software module in the e-mail list of software modules. The processor C 106 may also activate a timer to measure the time for a response (software module complete message).

If the software module complete message arrives before the time limit for execution of the first software module, then the processor C 106 may issue a function call for a subsequent (second) software module. If the software module message does not arrive before expiration of the time limit for the first software module, then the processor C 106 may issue another function call for the first software module, located in the same or in another computer. Alternately, once the first routine executes, it may call for a search of a second routine, and when identified on the application P2P network, may pass control to the machine containing the routine to execute the software, thereby reducing the need for Processor C 106 to allocate control for each software module.

Upgrades to the network 100 may be accomplished by detecting the file modification dates as indicated in the P2P directory service (which may be LDAP based), and replacing files with older dates with the newer file. More so, the directory service should insure that multiple copies of a file exist on multiple machines. This can be accomplished with a routine that determines if software resides on the network that is not on the local machine, and loads that file on to the machine. It is also desirable that an expiration time on files exists so to allow for the automatic removal of files no longer required on the network. The P2P network should be implemented across multiple LAN connections as placing it on a single LAN network makes it susceptible to a network fault, but as it maps into its own virtual network, it is more resilient to a single network failure. Another benefit is that the requirement to program the existence of multiple LAN communication paths is part of the underlying P2P architecture and does not need to be part of the delivered software application.

The system 100 described above offers a number of differences and advantages over prior solutions. One significant difference over prior solutions is that whereas prior solutions closely coupled the software application to the hardware platform, the solution described above presents an alternate model for the software deployment whereby the hardware is abstracted from the presence of the software by distributing software executable applications, accessible global data, and the presence of resources in a manner that is separate and apart from a singular combination of software functioning on a piece of hardware.

Software developments evolved from the model where software microcode, in essence, reprograms how the hardware behaves and functions. That is, the binary level language representing the software defined the function that the hardware was to perform for each and every instruction. Unfortunately, this model tightly coupled the software to the hardware element and failed to address redundancy issues associated with both the hardware and software modules themselves. The approach described herein effectively begins to decouple the software from the hardware architecture to allow both to achieve a higher level of sustainability in the presence of fault conditions.

A specific embodiment of method and apparatus for processing information within a computing system has been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of processing transactions within a computing system, such method comprising:
    receiving thru the Internet a contact from a client of an organization that operates and uses the computing system for its own internal business purposes;
        providing a processing application within the computing system for distributing the received contact to one of a plurality of human agents of the organization for servicing contacts with clients based upon a context of the contact, where said provided processing application has been previously divided into a sequence of separated software modules based upon a predetermined criteria;
    locating each software module of the sequence of software modules to distribute the software modules within a set of computers of the computer system where the set of computers are interconnected via a peer-to-peer network; and
    sequentially activating the sequence of software modules of the processing application by performing a search over the network to locate and activate each software module to process and distribute the contact to the human agent and activating a backup copy of a software module of the sequence when the software module does not complete a set of processing steps of the software module within a predetermined time.

2. The method of processing information as in claim 1 further comprising a first software module of the sequence of software modules saving an interim result produced by the first software module in a database that is different from a computer in which the first software module operates.

3. The method of processing information as in claim 2 further comprising the first software module sending a software module complete message to a monitoring computer.

4. The method of processing information as in claim 3 further comprising the monitoring computer activating a second software module of the sequence upon receiving the software module complete message.

5. The method of processing information as in claim 2 further comprising the processing application sending a heartbeat message to a monitoring computer.

6. The method of processing information as in claim 2 further comprising the first software module activating a second software module of the sequence when the first software module completes a set of processing steps of the first software module.

7. The method of processing information as in claim 3 further comprising the second software module retrieving the interim results from the database.

8. The method of processing information as in claim 3 further comprising providing a backup copy of the database.

9. The method of processing information as in claim 1 further comprising defining the processing application as a contact server.

10. The method of processing information as in claim 1 further comprising defining the processing application as a agent server.

11. The method of processing information as in claim 1 further comprising defining the processing application as a contact distributor.

12. An apparatus for processing transactions within a computing system, such apparatus comprising:
    means for receiving a contact with a client of an organization that operates the computing system;
    means, including a processing application compiled into a sequence of separated software modules based upon a predetermined criteria, for distributing the received contact to one of a plurality of human agents of the organization based upon a context of the contact;
    means for locating each software module of the sequence of software modules within a set of computers of the computing system where the set of computers are interconnected via a peer-to-peer network;
    means for sequentially activating the sequence of software modules of the processing application by performing a search over the network to locate and activate each software module to process and distribute the contact to the human agent; and
    means associated with a first software module of the sequence of software modules for saving an interim result produced by the first software module in a database that is different from a computer in which the first software module operates.

13. The apparatus for processing information as in claim 12 further comprising means associated with the first software module for sending a software module complete message to a monitoring computer.

14. The apparatus for processing information as in claim 13 further comprising means within the monitoring computer for activating a second software module of the sequence upon receiving the software module complete message.

15. The apparatus for processing information as in claim 13 further comprising means associated with the second software module for retrieving the interim results from the database.

16. The apparatus for processing information as in claim 13 further comprising means for providing a backup copy of the database.

17. The apparatus for processing information as in claim 12 further comprising means associated with the processing application for sending a heartbeat message to a monitoring computer.

18. The apparatus for processing information as in claim 12 further comprising means associated with the first software module for activating a second software module of the sequence when the first software module completes a set of processing steps of the first software module.

19. The apparatus for processing information as in claim 12 further comprising means for activating a backup copy of a software module of the sequence when the software module does not complete a set of processing steps of the software module within a predetermined time period.

20. An apparatus for processing information within a computing system, such apparatus comprising:
   an Internet connection that detects contacts with clients of an organization that operates the computing system;
   a plurality of computers interconnected via a peer-to-peer network including a computer application that distributes the detected contacts to human agents of the organization, said computer application having been compiled into a sequence of separated software modules based upon a predetermined criteria and where the software modules are distributed among the plurality of computers within the computing system; and
   a call function within at least some software modules of the sequence of software modules that performs a search over the network to locate a subsequent software module of the sequence of software modules and that activates the subsequent software module of the sequence of software modules of the application to process and distribute the contacts to the human agents; and
   a processor that activates a backup copy of a software module of the sequence when the software module does not complete a set of processing steps of the software module within a predetermined time period.

21. The apparatus for processing information as in claim 20 further comprising defining the computing system as being an automatic contact distributor and the processed information as being business information of an organization operating the automatic contact distributor.

22. The apparatus for processing information as in claim 20 further comprising a first software module of the sequence of software modules saving an interim result produced by the first software module in a database that is different from a computer in which the first software module operates.

23. The apparatus for processing information as in claim 22 wherein the call function further comprises a software module complete message that the first software module sends to a monitoring computer.

24. The apparatus for processing information as in claim 23 further comprising a second software module of the sequence that the monitoring computer activates upon receiving the software module complete message.

25. The apparatus for processing information as in claim 22 further comprising the first processing application sending a heartbeat message to a monitoring computer.

26. The apparatus for processing information as in claim 23 further comprising a backup copy of the database.

27. A method of processing transactions within a computing system of an organization, such method comprising:
   providing a processing application within the computing system for distributing a detected contact to one of a plurality of human agents of the organization based upon a context of the contact, said processing application having been compiled into a sequence of separated software modules based upon a predetermined criteria;
   locating each software module of the sequence of software modules within a set of computers of the computing system where the set of computers are interconnected via a peer-to-peer network;
   sequentially activating the sequence of software modules of the processing application by performing a search over the network to locate and activate each software module to process and distribute the contact to the human agent, and
   saving an interim result produced by a first software module of the sequence of software modules in a database that is different from a computer in which the first software module operates.

28. The method of processing information as in claim 27 further comprising defining the computing system as being an automatic contact distributor and the processed information as being business information of an organization operating the automatic contact distributor.

29. The method of processing information as in claim 27 further comprising the first software module sending a software module complete message to a monitoring computer.

30. The method of processing information as in claim 29 further comprising the monitoring computer activating a second software module of the sequence upon receiving the software module complete message.

31. The method of processing information as in claim 29 further comprising the second software module retrieving the interim results from the database.

32. The method of processing information as in claim 29 further comprising providing a backup copy of the database.

33. The method of processing information as in claim 27 further comprising the processing application sending a heartbeat message to a monitoring computer.

34. The method of processing information as in claim 27 further comprising the first software module activating a second software module of the sequence when the first software module completes a set of processing steps of the first software module.

35. The method of processing information as in claim 27 further comprising activating a backup copy of a software module of the sequence when the software module does not complete a set of processing steps of the software module within a predetermined time period.

* * * * *